(12) United States Patent
Benedetti

(10) Patent No.: US 11,254,508 B2
(45) Date of Patent: Feb. 22, 2022

(54) DISCRETE CONVEYANCE UNIT, FOR BLUEBERRIES AND SIMILAR FRUIT OR VEGETABLE PRODUCTS

(71) Applicant: UNITEC S.P.A., Lugo (IT)

(72) Inventor: Luca Benedetti, Ravenna (IT)

(73) Assignee: UNITEC S.P.A., Lugo (IT)

(*) Notice: Subject to any disclaimer, the term of this patent is extended or adjusted under 35 U.S.C. 154(b) by 872 days.

(21) Appl. No.: 16/071,434

(22) PCT Filed: Jan. 19, 2017

(86) PCT No.: PCT/IB2017/050284
§ 371 (c)(1),
(2) Date: Jul. 19, 2018

(87) PCT Pub. No.: WO2017/125873
PCT Pub. Date: Jul. 27, 2017

(65) Prior Publication Data
US 2021/0206577 A1 Jul. 8, 2021

(30) Foreign Application Priority Data
Jan. 20, 2016 (IT) .................. 102016000004963

(51) Int. Cl.
*B65G 17/24* (2006.01)
*A23N 15/00* (2006.01)
(Continued)

(52) U.S. Cl.
CPC ............. *B65G 17/24* (2013.01); *A23N 15/00* (2013.01); *B65G 17/34* (2013.01); *B65G 17/42* (2013.01); *B65G 2201/0211* (2013.01)

(58) Field of Classification Search
CPC ........ B65G 17/24; B65G 17/42; B65G 17/34; B65G 2201/0211; B65G 17/44;
(Continued)

(56) References Cited

U.S. PATENT DOCUMENTS 5,042,637 A * 8/1991 LaVars ................ B65G 47/965
198/370.02
5,195,628 A 3/1993 Warkentin
(Continued)

FOREIGN PATENT DOCUMENTS

CL 2018001944 A1 11/2018
CN 101817002 A 9/2010
(Continued)

OTHER PUBLICATIONS

"CN101817002A Fruit Conveying Cup", EPO machine translation. (Year: 2021).*
(Continued)

*Primary Examiner* — Mark A Deuble
(74) *Attorney, Agent, or Firm* — Cantor Colburn LLP

(57) ABSTRACT

A discrete conveyance unit for blueberries and similar fruit or vegetable products that can be installed in series along a processing line for blueberries, or similar fruit or vegetable products, includes a central plate, which can be moved cyclically along at least one portion of the line. The unit further includes a plurality of axially symmetrical supporting elements which are coupled to respective opposite lateral edges of the plate. Each adjacent pair of elements defines a respective support and accommodation seat for a corresponding blueberry, or similar fruit or vegetable product, so as to allow its discrete conveyance along the at least one portion of the line.

5 Claims, 3 Drawing Sheets

(51) Int. Cl.
*B65G 17/34* (2006.01)
*B65G 17/42* (2006.01)

(58) Field of Classification Search
CPC .... B65G 47/268; B65G 21/10; B65G 41/008; B65G 2207/28; A23N 15/00; A23N 2015/008; B07C 5/10; B07C 2501/009
See application file for complete search history.

(56) References Cited

U.S. PATENT DOCUMENTS

| | | | |
|---|---|---|---|
| 5,330,045 A | | 7/1994 | Hodlewsky |
| 7,395,914 B2* | | 7/2008 | van Wijngaarden .................... B65G 47/962 198/370.04 |
| 8,746,435 B2* | | 6/2014 | Nijland ............... B07C 5/342 198/370.04 |
| 9,004,287 B2* | | 4/2015 | Liedl ............... B07C 5/342 209/541 |
| 9,475,643 B1* | | 10/2016 | Odman ............... B65G 17/24 |
| 9,527,680 B2* | | 12/2016 | Anstis ............... B07C 5/36 |
| 2006/0151289 A1* | | 7/2006 | Kennedy ............. B65G 47/962 198/370.04 |
| 2011/0309004 A1 | | 12/2011 | Morley |

FOREIGN PATENT DOCUMENTS

| | | |
|---|---|---|
| JP | 2009046129 A | 3/2009 |
| WO | 2014073987 A1 | 5/2014 |
| WO | 2017125872 A1 | 7/2017 |

OTHER PUBLICATIONS

International Search Report dated May 10, 2017 re: Application No. PCT/IB2017/050284, pp. 1-4, citing: WO 2014/073987 A1, US 5 330 045 A, CN 101 817 002 A, US 2011/0309004 A1 and U.S. Pat. No. 5,195,628 A.

Written Opinion dated May 10, 2017 re: Application No. PCT/IB2017/050284, pp. 1-7, citing: WO 2014/073987 A1, US 5 330 045 A, CN 101 817 002 A, US 2011/0309004 A1 and U.S. Pat. No. 5,195,628 A.

RU Office Action dated Apr. 27, 2020 re: Applicatrion No. 2018129970/11, pp. 1-9, citing: WO 2014/073987 A1, JP 2009-046129 A, CN 101817002 A, U.S. Pat. No. 5,330,045 A and US 2011/0309004 A1.

\* cited by examiner

DISCRETE CONVEYANCE UNIT, FOR BLUEBERRIES AND SIMILAR FRUIT OR VEGETABLE PRODUCTS

TECHNICAL FIELD

The present disclosure relates to a discrete conveyance unit, for blueberries and similar fruit or vegetable products.

BACKGROUND

In industry, the necessity often arises to move and at the same time process products of every kind (in various ways and for various reasons), by way of systems and movement lines that are partially or completely automated.

Such need arises for example in all those contexts (increasingly numerous) in which meeting a rising demand must be married to a standard of quality that is in any case high, in light of the demand of customers that are often demanding and/or expert.

Such needs are not unknown to the companies that process and distribute fruit and vegetable products on an industrial scale, and which resort with ever-increasing frequency to large-scale automated systems and lines, used for the movement, the checking, the sizing, the packaging, and more generally the treatment of those fruit and vegetable products.

Precisely with regard to the checking and the sizing of the fruit and vegetable products, for example in order to enable the division thereof into homogeneous groups according to preset parameters (color, size, sugar content, etc.) and/or simply in order to separate and reject the flawed products, it is often necessary to move them discretely along at least one portion of the automated lines, so as to subject each one of them to the necessary checks.

In fact, the position of each fruit has to be known instant by instant and the conveyance unit has to be able to individually move each fruit (or other fruit and vegetable product), so as to subject it to the necessary checks and allow the subsequent machines to arrange it appropriately, as a function of the outcome of those checks.

Such implementation solutions are not devoid of drawbacks, however.

It should be noted in fact that in order to obtain the functionalities described above, conveyance units must be provided along the lines that are capable of moving each product while keeping it separate or distinct from the adjacent one, so as to enable targeted checks on each one.

Such needs arise for any type of fruit and vegetable product, and therefore also for those that are small in size, such as for example blueberries.

Since at the same time it is necessary to have the capacity to process a high number of blueberries (in order not to penalize productivity), this inevitably translates to a plurality of conveyance units, which have to be distributed in series along the automated line, and which move cyclically along a preset path in order to ensure the transfer of the blueberries between the various stations for checking and sizing (and subsequent processing).

This imposes considerable work in the assembly step (and disassembly step, if any) in order to install all the conveyance units that are necessary along the line.

Moreover, it should be noted that a further complication, and one that is not easy to resolve, derives from the need to many the individual conveyance of each blueberry (for the reasons already explained) with the construction constraints that derive from the means chosen for entraining the units, which determine set spacings that are often not compatible with the dimensions of the blueberries and therefore with the optimal distribution of the units.

SUMMARY

The aim of the present disclosure is to solve the above mentioned problems, by providing a unit, adapted for the discrete conveyance for blueberries and similar fruit or vegetable products, that ensures practical methods of assembly (and disassembly).

Within this aim, the disclosure provides a conveyance unit that ensures high resistance to stresses.

The disclosure also provides a unit that is versatile, adapted to the optimal conveyance of blueberries and similar fruit or vegetable products independently of any construction constraints imposed by the other components of the line.

The disclosure further provides a unit that adopts an alternative technical and structural architecture to those of conventional units and which can be easily implemented using elements and materials that are readily available on the market.

The disclosure also provides a unit that is low cost, is safe in use, and ensures a high reliability of operation.

This aim and these and other advantages which will become better apparent hereinafter are achieved by providing a discrete conveyance unit, for blueberries and similar fruit or vegetable products, that can be installed in series along a processing line for blueberries, or similar fruit or vegetable products, characterized in that it comprises a central plate, which can be moved cyclically along at least one portion of the line, and a plurality of axially symmetrical supporting elements which are coupled to respective opposite lateral edges of said plate, each adjacent pair of said elements defining a respective support and accommodation seat for a corresponding blueberry or similar fruit or vegetable product, for its discrete conveyance along the at least one portion of the line.

BRIEF DESCRIPTION OF THE DRAWINGS

Further characteristics and advantages of the disclosure will become better apparent from the detailed description that follows of a preferred, but not exclusive, embodiment of the unit according to the disclosure, which is illustrated by way of non-limiting example in the accompanying drawings, wherein.

DETAILED DESCRIPTION OF THE DRAWINGS

Figure 1:
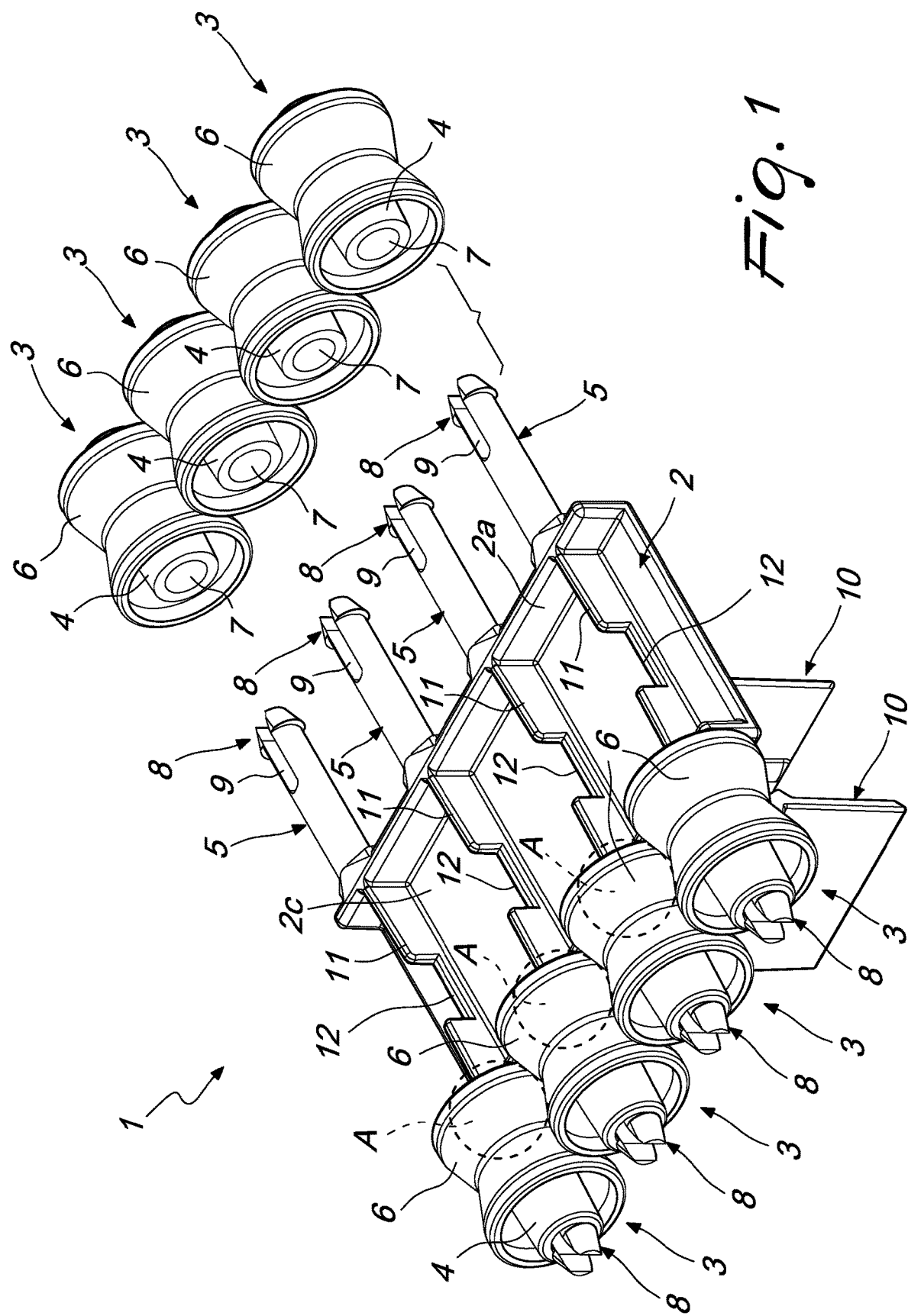
FIG. 1 is a partially exploded perspective view of the unit according to the disclosure.
Figure 2:
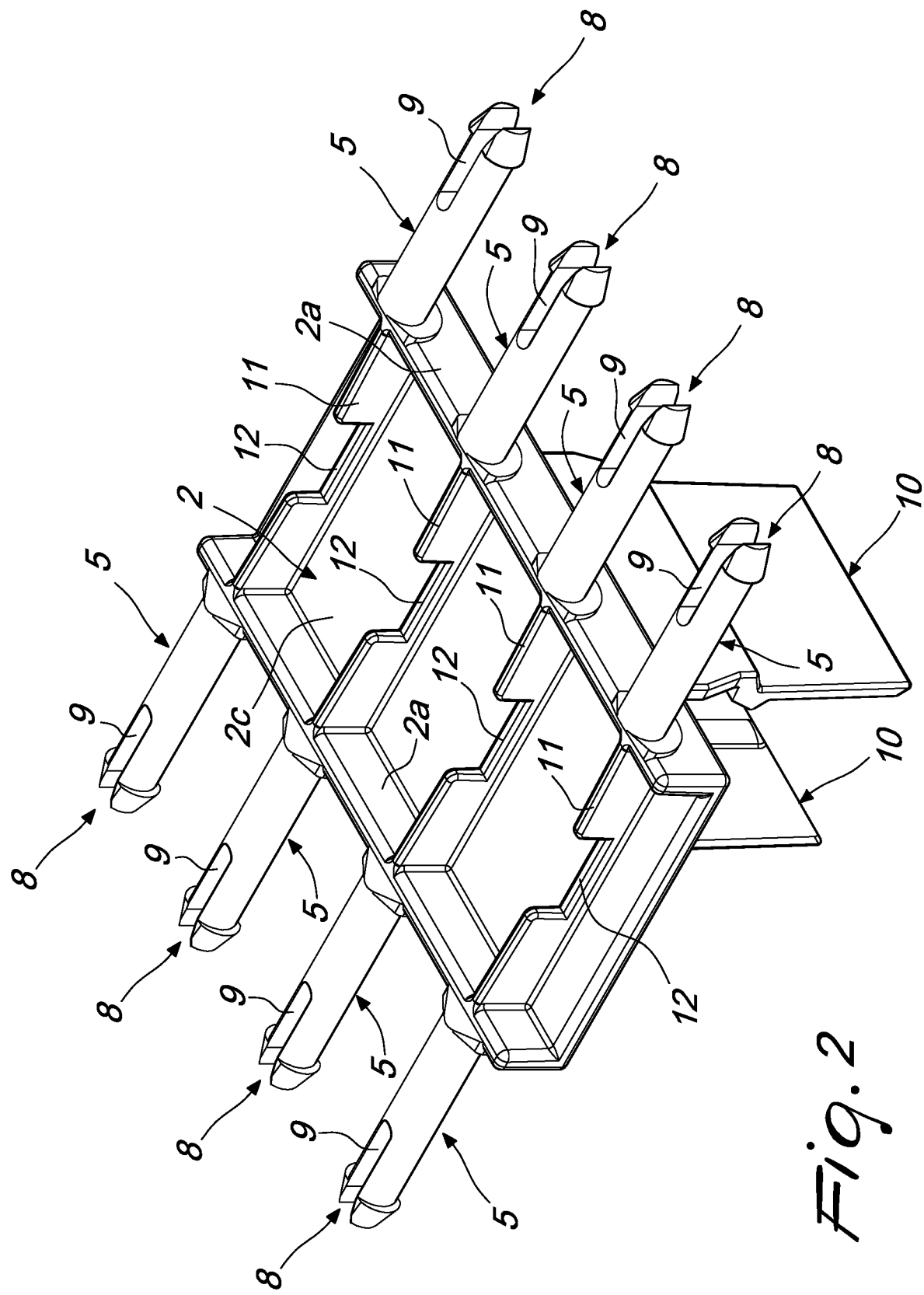
FIG. 2 is a perspective view of the plate.

With particular reference to FIGS. 1-4, the reference numeral 1 generally designates a discrete conveyance unit, for blueberries A and similar fruit or vegetable products, that can be installed (preferably) in series along a processing line for blueberries A, or similar fruit or vegetable products.

Apart from the innovative peculiarities of the unit 1, which will be illustrated hereinbelow, the processing line can be conventional (and for this reason it is not shown in the figures) and comprise in series (usually, but not necessarily, aligned) a plurality of stations for checking, processing, and sizing, which are interposed between an area for loading the products and a final area.

Between the various stations therefore, devices operate for transferring the fruit or vegetable products, and on at least one of these the units 1 are installed, which are adapted as will be seen to the discrete conveyance of the blueberries A along a set portion of the line, a portion that is usually affected by one or more of the above mentioned stations.

In general therefore each unit 1 can find application at any point of automated systems used for processing fruit or vegetable products, where there is in fact a need to convey them discretely, for example in order to subject them one by one to the necessary verifications, while at the same time keeping control of their position, in order to actuate the correct treatments downstream as a function of the outcome of such verifications.

It should be noted from this point onward that in the preferred application of the disclosure, to which reference will frequently be made in the present discussion, the fruit or vegetable products are blueberries A, the discrete conveyance of which poses problems that are not easy to resolve for the companies that make the above mentioned lines, but which are effectively resolved, as will be seen, with the adoption of the units 1.

The need to move quickly large quantities of blueberries A in fact, in addition to increasing the complexity of conventional lines, clashes with the need to use the utmost care in handling such fruits, which are very delicate but at the same time prized (and costly).

In any case, it should be emphasized that the possibility is not ruled out of using the unit 1 according to the disclosure for handling, conveying and/or checking other fruits or fruit or vegetable products in general. In the following pages, all specific reference to blueberries A must therefore be understood to be extended to any similar fruit or vegetable product.

According to the disclosure, the unit 1 comprises a central plate 2, which is preferably provided by molding in polymeric material. The plate 2 can be cyclically moved along at least one portion of the line (for example, according to the methods that will be described below).

Furthermore, the unit 1 comprises a plurality of axially symmetrical supporting elements 3, which are also preferably provided by molding in polymeric material. The elements 3 are coupled to respective mutually opposite lateral edges 2a of the plate 2.

As can also be seen from FIG. 1, each adjacent pair of elements 3 defines a respective support and accommodation seat for a corresponding blueberry A (or for a similar fruit or vegetable product), so as to allow its discrete conveyance along the at least one portion of the line.

So effectively, by installing only one conveyance unit 1 on the line, and moving it along the desired portion, it is possible to convey therewith, discretely, a desired number of blueberries A, each one on a respective pair of elements 3.

For example, the accompanying figures show (purely for the purposes of example) an embodiment in which each (raised) lateral edge 2a of the plate 2 is coupled to four supporting elements 3, which can effectively discretely convey three blueberries A (and therefore six in total, for a same unit 1), subjecting them in sequence, one by one, to the necessary processing stages.

It should likewise be noted that FIG. 1 also shows how each blueberry A is kept spaced apart from the adjacent (subsequent) one, therefore allowing the execution of checks, verifications, actions in general, on each product, independently of the others.

In addition, it should be noted that, in the preferred application, a plurality of units 1 are arranged in series along the same line (each one substantially in contact with the subsequent one). Therefore, an additional blueberry A can be accommodated and jointly supported by the last element 3 of one unit 1 and by the first element 3 of the subsequent unit 1. So effectively, by using four elements 3 for the edge 2a of the plate 2, each unit 1 installed on the line will correspond to the discrete movement of eight blueberries A.

In particular, in an embodiment of significant practical interest, cited by way of non-limiting illustration of the application of the disclosure, each element 3 comprises a central stem 4, which can be coaxially coupled to a respective support 5, which extends perpendicularly (and rigidly) from a corresponding lateral edge 2a.

Furthermore, coaxially fixed around the stem 4 of each element 3 is a respective contoured bushing 6, which progressively tapers from each one of the respective ends toward the central portion: so its profile has a substantially V-shaped progression.

In such embodiment, corresponding adjacent pairs of bushings 6 define a respective seat for a blueberry A, with the respective lateral surfaces (which are V-shaped precisely for this reason).

More specifically, each stem 4 is provided internally with a through coaxial duct 7, in order to allow the rotatable coupling of the stem 4 with the respective support 5 and consequently in order to ensure the possibility of rotation of each bushing 6 about its own longitudinal axis, independently of its advancement motion along the line.

So effectively, each element 3 is mounted idle on the respective support 5. In this manner, it is possible to actuate the rotation of the element 3 by way of an apparatus comprised in the line and thus impart, indirectly, a corresponding rolling to the blueberry A that rests on the bushings 6, during its movement along the line.

Such possibility is of undoubted practical interest, since, during its transfer along the line, the rolling makes it possible to vary the orientation of the blueberry A, while still keeping it resting on the bushings 6.

This makes it possible for example for a video camera or other vision instrument, but in any case fixed (for example arranged above the line), to analyze each part of the external surface of the blueberry A (and in some cases, even its interior), while this is being moved downstream.

The rotation of the bushings 6 can for example be imparted by a belt arranged parallel to the line and kept in, or brought into, contact with the bushings 6 and therefore such as to confer on the latter, by friction, a rotary motion while the units 1 advance along their predefined path.

In the preferred embodiment, illustrated in the accompanying figures for the purposes of non-limiting example of application of the disclosure, each support 5 is constituted substantially by an axial pivot, which extends perpendicularly from the corresponding lateral edge 2a and is provided on the other end with an enlarged head 8, which has a longitudinal cut 9.

By virtue in fact of the cut 9, the head 8 is elastically deformable, and this enables its insertion into the duct 7 (which would otherwise have a smaller transverse cross-section than the space occupation of the head 8) and the mounting of the element 3 on the support 5.

Once assembly has been performed (as can be seen from FIG. 1) the head 8 protrudes from the duct 7 and opposes, by interference, the subsequent extraction of the respective element 3 from the corresponding support 5 (while still ensuring the possibility of rotation about the longitudinal axis).

Conveniently, the plate 2 comprises means for stable coupling to a chain, comprised in the line, or to a similar movement device.

So according to conventional methods, the line can have a chain, which is moved by a respective motor and is wrapped in a belt fashion substantially about the straight path that it is desired to impart to the blueberries A (and therefore to the units 1).

The coupling means therefore ensure the mounting of the plate 2 (and of the unit 1) on the chain, so as to enable its subsequent entrainment along the preset path at each work cycle.

In particular, in the embodiment proposed for the purposes of non-limiting example in the accompanying figures, the means comprise a pair of wings 10 which are substantially parallel, extend longitudinally from a first face 2b of the plate 2, and can be coupled stably, by interlocking, with a link of the chain.

Figure 4:
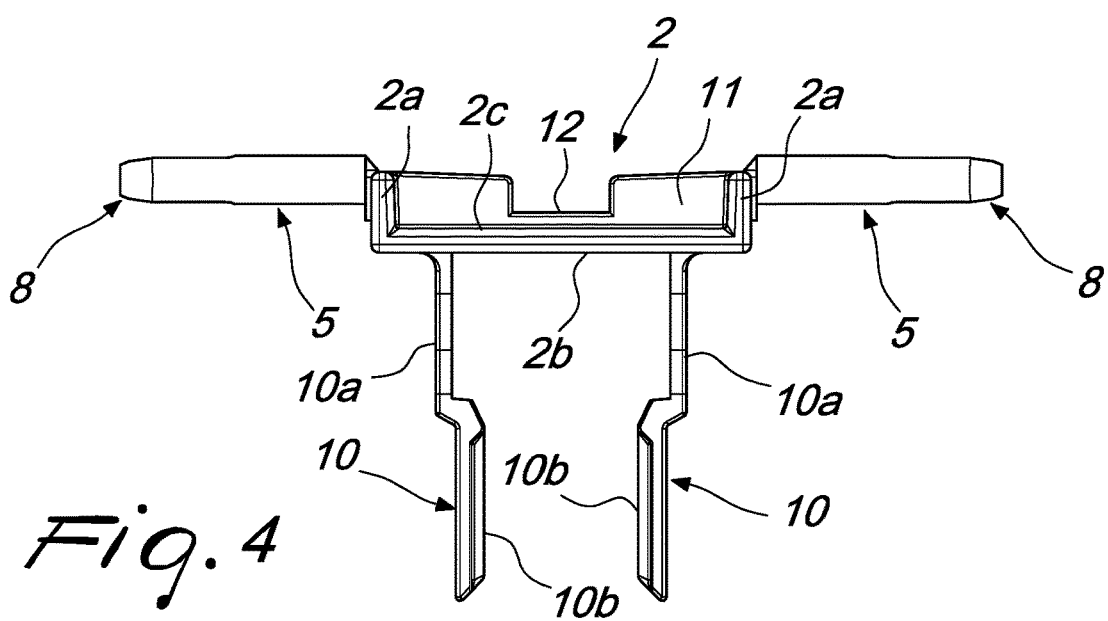
FIG. 4 is a front elevation view of the plate of FIG. 2.

More specifically, as is evident for example from FIG. 4, each wing 10 is composed of a pair of flaps 10a, 10b which are arranged side by side and mutually offset: thus, a respective link of the chain can be accommodated stably by interlocking, by elastic forcing, between them, thus ensuring the coupling between the chain and the unit 1 and therefore the desired movement of the latter.

Conveniently, the unit 1 comprises a plurality of transverse reinforcement ribs 11, which extend from a second face 2c of the plate 2, which is opposite the first face 2b.

Figure 3:
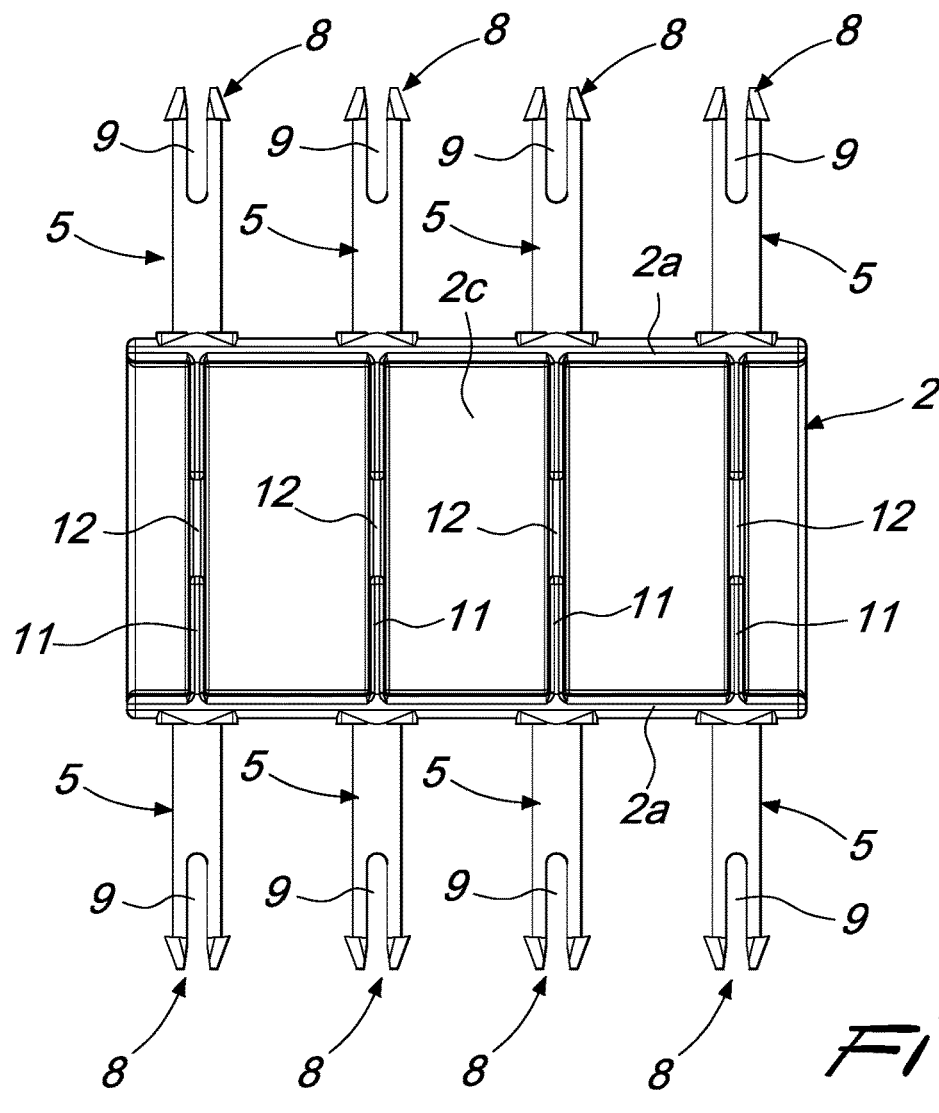
FIG. 3 is a view from above of the plate of FIG. 2.

Also with reference to FIGS. 1, 3 and 4, such ribs 11 are equal in number to the elements 3 coupled to each lateral edge 2a of the plate 2 and are aligned with the respective supports 5 (and with the elements 3 proper).

Furthermore, each rib 11 has a central groove 12: in this way, the plate 2 is conveniently adapted to be slideably guided by a respective central rail (comprised in the line), at the aligned grooves 12.

Operation of the unit according to the disclosure is the following.

As has been seen, each unit 1 can be easily coupled to the chain of a line for processing blueberries A (and optionally subsequently decoupled), simply by forcing the elastic coupling of its wings 10 to a link of the chain, which is entrained along a closed path by a respective motor.

Moreover, the coupling of each element 3 to the respective support 5 (as the optional decoupling) is also obtained in a practical and easy manner. For the coupling, it is in fact sufficient to slide the pivot into the duct 7, forcing the temporary deformation of the head 8, until the latter is made to protrude from the other end, where it can subsequently keep the element 3 in position, thus preventing the accidental extraction thereof (the extraction is however easily obtainable, by again forcing the deformation of the head 8).

Support for the blueberries A is ensured by the adjacent pairs of elements 3 (and by their bushings 6 in particular), which are mounted so that they can rotate (idle) on the respective supports 5, so as to allow the free rotation (on command) of the bushings 6 proper, while they advance, entrained by the chain, for the reasons already noted.

It has already been found that the units 1 ensure, as desired, the support and the discrete conveyance of the blueberries A, since they are kept sufficiently spaced apart from each other (an element 3 is substantially interposed between each adjacent pair of blueberries A).

It should likewise be noted that the support and the conveyance are achieved with methods that do not cause damage in any way to the blueberries A (which simply rest by gravity on the elements 3, which may be coated with soft materials): the units 1 therefore does not subject the fruit or vegetable products conveyed to any impact or violent stress, and on the contrary moves them with the utmost care.

Each unit 1 (which can be installed on the line with a single operation of mounting/interlocking) therefore supports and discretely conveys a number, which may be high, of blueberries A (substantially, one for each element 3, if the units 1 are arranged contiguously).

Especially when it is desired to process a particularly large number of blueberries A (as is required increasingly often) and it is necessary to provide for the discrete conveyance thereof, in order to allow specific checks to be carried out on each one of them, it is evident that using the units 1 therefore makes it possible in any case to keep low the iterations of the steps of assembly (and optionally of subsequent disassembly), moreover evidently quick and simple, thus achieving the set aim.

Thus the activities of installation of the automated line used for processing blueberries A and similar fruit or vegetable products are very rapid and easy.

Furthermore, it should be noted that by varying at will the number of supports 5 and therefore the number of elements 3 associated with a single plate 2 (obviously adapting the measurements thereof, if necessary), it is possible to vary at will the ratio of chain links to blueberries A moved in each time interval, thus obtaining a sort of decoupling from the construction constraints imposed by the chain itself, thus achieving an additional result of undoubted practical interest, since it ensures maximum versatility for the disclosure.

Moreover, it should be noted that, in light of the specific application requirements, the user can easily vary the specific ways in which each blueberry A is supported and conveyed, by modifying only the shape structure (the external surface) of the elements 3, without requiring other and more extensive modifications to the unit 1 (and to the plate 2, which remains unaltered).

Similarly, even small and simple modifications of the plate (and of the coupling means) can make it possible to adapt the unit 1 according to the disclosure to different spacings and links/chains.

In addition, as has already been noted in the foregoing pages, the presence of the ribs 11, which can be easily obtained by molding in a single piece with the plate 2, ensures greater solidity and resistance to the plate 2 proper, which can thus optimally withstand the stresses that derive from normal operation.

Finally, it should be noted that the ribs 11 make it possible to define, with the aligned grooves 12, a provision for guided sliding on an external rail.

In practice it has been found that the unit according to the disclosure fully achieves the set aim, since the use of a central plate and of a plurality of axially symmetrical supporting elements, which define respective resting and accommodation seats for corresponding blueberries, or similar fruit or vegetable products, enables the discrete conveyance thereof, with a solution that ensures practical methods of assembly (and disassembly).

The disclosure, thus conceived, is susceptible of numerous modifications and variations. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The disclosures in Italian Patent Application No. 102016000004963 (UB2016A000534) from which this application claims priority are incorporated herein by reference.

The invention claimed is:

1. A discrete conveyance unit, for fruit or vegetable products, configured to be installed in series along a processing line for fruit or vegetable products, comprising a central plate moved cyclically along at least one portion of the line, and a plurality of axially symmetrical supporting elements coupled to respective opposite lateral edges of said central plate, each adjacent pair of said supporting elements defining a respective support and accommodation seat for a corresponding fruit or vegetable product, for discrete conveyance along the at least one portion of the line, wherein said central plate comprises means for stable coupling to a chain, wherein said means comprise a pair of wings which are substantially parallel, extend longitudinally from a first face of said central plate, and can be coupled stably, by interlocking, with a link of the chain;

the discrete conveyance unit further comprising a plurality of transverse reinforcement ribs that extend from a second face of said central plate, arranged opposite said first face, and are aligned with respective said supports, wherein each one of said ribs has a central groove, said plate being slideably guided by a respective central rail, at said aligned grooves.

2. The discrete conveyance unit according to claim 1, wherein each one of said supporting elements comprises a central stem configured to be coupled coaxially with a respective support, which extends at right angles from a corresponding said lateral edge, a contoured bushing being fixed coaxially around said stem and tapering progressively from each one of respective ends toward the central portion, corresponding adjacent pairs of said bushings defining a respective seat with respective lateral surfaces.

3. The discrete conveyance unit according to claim 2, wherein each one of said stems is provided internally with a through coaxial duct, for the rotatable coupling of said stem to the respective said support and the possibility of rotation of each one of said bushings about its own longitudinal axis independently of the advancement along the line, the rotation being actuatable in order to impart a corresponding rolling motion to the fruit or vegetable product, that rests on said bushings, during movement along the line.

4. The discrete conveyance unit according to claim 3, wherein each one of said supports is substantially constituted by an axial pivot, which extends at right angles from the corresponding said lateral edge and is provided on the other end with an enlarged head provided with a longitudinal cut, said head being elastically deformable, by virtue of said cut, and said head being configured for insertion into said duct and the assembly of said element on said support, once assembly has been performed said head protruding from said duct and opposing by interference the extraction of the respective said element from the corresponding said support.

5. The discrete conveyance unit according to claim 1, wherein each one of said wings is composed of a pair of flaps which are arranged side by side and mutually offset, a respective link of the chain being accommodatable stably by interlocking, by elastic forcing, between said flaps of said wings.

* * * * *